(12) United States Patent  
Hamdi

(10) Patent No.: US 8,155,095 B2  
(45) Date of Patent: Apr. 10, 2012

(54) WIRELESS LAN DATA RATE ADAPTATION

(75) Inventor: Mounir Hamdi, Jowloon (CN)

(73) Assignee: STMicroelectronics Ltd., Tsim Sha Tsui, Kowloon (HK)

( * ) Notice: Subject to any disclaimer, the term of this patent is extended or adjusted under 35 U.S.C. 154(b) by 760 days.

(21) Appl. No.: 12/327,471

(22) Filed: Dec. 3, 2008

(65) Prior Publication Data

US 2009/0080403 A1     Mar. 26, 2009

Related U.S. Application Data

(63) Continuation of application No. 11/070,945, filed on Mar. 3, 2005, now Pat. No. 7,463,583.

(51) Int. Cl.  
*H04W 4/00* (2009.01)

(52) U.S. Cl. ............................ 370/338; 455/39; 455/522

(58) Field of Classification Search ........................ None  
See application file for complete search history.

(56) References Cited

U.S. PATENT DOCUMENTS

| | | | |
|---|---|---|---|
| 6,760,596 B1 * | 7/2004 | Fiorini et al. ................. | 455/522 |
| 2005/0128998 A1 * | 6/2005 | Jelitto et al. ................. | 370/349 |
| 2005/0143115 A1 * | 6/2005 | Hiddink et al. ............... | 455/522 |
| 2005/0286410 A1 * | 12/2005 | Truong et al. ................. | 370/216 |

OTHER PUBLICATIONS

Ad Kamerman and Leo Monteban, "WaveLAN-II: A High-Performance Wireless LAN for the Unlicensed Band," *Bell Labs Technical Journal*, pp. 118-133, Summer 1997.  
Chevillat, et al., "A Dynamic Link Adaptation Algorithm for IEEE 802.11a Wireless LANs", *IEEE International Conference on Communications* (ICC), pp. 1141-1146, 2003.  
B. Sadeghi, et al., "Opportunistic Media Access for Multirate Ad Hoc Networks," *ACM MobiCom 2002*, Sep. 2002.  
Javier del Prado, et al., "Link Adaptation Strategy for IEEE 802.11 WLAN via Received Signal Strength Measurement", *IEEE International Conference on Communications*, May 2003.  
A. J. van der Vegt, "Auto Rate Fallback Algorithm for the IEEE 802.11a Standard," technical report, Utrecht University, 2003.  
Holland, et al., "A Rate-Adaptive MAC Protocol for Multi-Hop Wireless Networks," *ACM MobiCom '01*, pp. 236-251, 2001.  
Qiao, et al., "Goodput analysis and Link Adaptation for IEEE 802.11a Wireless LANs," *On Mobile Computing*, vol. 1, No. 4, pp. 278-292, Oct.-Dec. 2002.

* cited by examiner

*Primary Examiner* — Chirag Shah  
*Assistant Examiner* — Otis L Thompson, Jr.  
(74) *Attorney, Agent, or Firm* — Gardere Wynne Sewell LLP

(57) ABSTRACT

A WLAN communication system and algorithm that adaptively changes the data transmission rate of a communication channel based on changing channel conditions. The WLAN communication system or algorithm has two modes being a searching mode and a transmission mode. Furthermore, the WLAN communication system or algorithm incorporates an additive increase, multiplicative decrease (AIMD) function into the rate adaptation algorithm.

22 Claims, 6 Drawing Sheets

WIRELESS LAN DATA RATE ADAPTATION

CROSS REFERENCE TO RELATED APPLICATION

This application is a continuation of U.S. patent application Ser. No. 11/070,945, filed Mar. 3, 2005, the disclosure of which is hereby incorporated by reference.

BACKGROUND OF THE INVENTION

1. Technical Field of the Invention

The present invention relates to adapting or adjusting a data rate to maximize overall performance of a wireless local-area-network (WLAN). In particular, the present invention relates to a method for adjusting the data communication rate of an IEEE 802.11 standard WLAN connection or system.

2. Description of Related Art

The IEEE 802.11 standard for data communication provides a multi-rate capability. Transmission of data can occur at any of the allowable data rates specified by the IEEE 802.11 standard. In a wireless environment, communication and channel conditions affect the maximum usable transmission rate. The multi-rate capability of the IEEE 802.11 standard is supported at the physical layer. In particular, Media Access Control (MAC) mechanisms are used to exploit the multi-rate capability and maximize the overall data and information throughput of a WLAN. The IEEE 802.11 standard does not specify how to exploit a maximum data rate for the condition of a communication channel. The IEEE 802.11 standard leaves it to the individual developers to devise rate adaptation techniques that take advantage of the standard's multi-rate data communication capability.

To date, various rate adaptation schemes have been proposed and used with the IEEE 802.11 standard. The existing rate adaptation schemes can be classified into two categories, the first category being schemes that use the success and failure history of previous transmissions to aid in the selection of future data or communication rates. This first category may also be known as Auto Rate Feedback (ARF). The second category of rate adaptation schemes utilize signal measurements to aid selection of an appropriate data rate.

Providing more background about existing, first category, ARF schemes, the article by Kamerman et al, "Wave LAN-II: A High-Performance Wireless LAN for the Unlicensed Band," Bell Labs Technical Journal, pp. 118-133, Summer 1997 (the disclosure of which is hereby incorporated by reference) discusses a proposal for Lucent's WaveLAN-II devices and other commercial WLAN products. The described ARF style WLAN adaptation device basically switches between 1 and 2 Mbps transmission rates based on a timing function and the number of ACK frames that are not received back by the sending device. The default transmission rate is the higher rate. The transmission rate switches to the lower rate when two consecutive ACKs are not correctly received by the sending device. At the same time that the transmission rate switches to the lower rate, a timing function begins. The transmission rate will switch back to the higher transmission rate after a predetermined amount of time or when the number of consecutively, correctly received ACKs is equal to ten. This ARF scheme is easy to program and implement without modification to the current IEEE 802.11 standard. The disadvantage of this ARF scheme is that it cannot and does not react quickly to fluctuations in channel conditions.

Another ARF style rate adaptation scheme is proposed in Chevillat et al, "A Dynamic Link Adaptation Algorithm for IEEE 802.11a Wireless LANs," IEEE International Conference on Communications (ICC), pp. 1141-1146, 2003 (the disclosure of which is hereby incorporated by reference). This ARF scheme uses information, like ACKs, only available to the information sender, to estimate the channel condition. Thus, there is no feedback channel from the receiving device. This scheme uses only one failure threshold F and two success thresholds S, and $S_2$, corresponding to different channel conditions: a channel condition in a region of a higher Doppler Spread value ($S_1=3$) or in a region of lower Doppler Spread value ($S_2=10$).

Yet another discussion of ARF style rate adaptation schemes is discussed and evaluated in A. J. van der Vegt, "Auto Rate Fallback Algorithm for the IEEE 802.11a Standard", technical report, Utrecht University (the disclosure of which is hereby incorporated by reference). This presents an ARF style rate adaptation scheme very similar to the Lucent WaveLAN-II, discussed above, except for there being a different choice of fixed threshold values for determining when to switch the transmission rates to a higher or lower rate.

We now provide additional background on the second category of rate adaptation schemes, the schemes that utilize signal measurements to aid selection on an appropriate transmission data rate. In this category of rate adaptation schemes, the algorithms assume that there is additional communication between the sender and receiver regarding the communication link or channel condition. As a result, this type of rate adaptation scheme requires modifications or additions to the IEEE 802.11a standard. For example, the Receiver-Based Auto-Rate (RBAR) protocol, as discussed in Gavin Holland et al, "A Rate-Adaptive MAC Protocol for Multi-Hop Wireless Networks," ACM MobiCom '01, pp. 236-251, 2001 (the disclosure of which is hereby incorporated by reference), requires using an RTS/CTS handshaking process, which is not part of the IEEE 802.11a standard (the disclosure of which is hereby incorporated by reference). In this example, RBAR the receiver estimates the wireless channel condition by using a sample of the instantaneously-received signal strength from the end of the RTS reception. The RBAR protocol then feeds the transmission rate back to the sending device using the CTS packet portion of the RTS/CTS handshaking process.

Yet, another signal measuring-based rate adaptation scheme is referred to as the Opportunistic Adaptive Rate (OAR) scheme which transmits multiple data packets when the scheme believes that the channel condition is good and thereby achieves a slightly better throughput than the RBAR scheme.

In the reference by Daji Qiao, et al, "Goodput Analysis and Link Adaptation of IEEE 802.11a Wireless LANs," IEEE Trans. On Mobile Computing, vol. 1, no. 4, pp. 278-292, Oct.-Dec. 2002 (the disclosure of which is hereby incorporated by reference), a 'goodput' analysis for rate adaptation in an 802.11a WLAN is presented. This article suggests a coupling of the transmission rate and the data fragment size to the channel condition estimation. A mathematic model is used with the data fragment size to aid in computing the best rate. A drawback of this rate adaptation scheme is that it assumes perfect channel knowledge and thus is of little practical use.

Another proposed rate adaptation algorithm by Javier de Prado et al, "Link Adaptation Strategy for IEEE 802.11 WLAN via Received Signal Strength Measurement," IEEE International Conference on Communications, May 2003 (the disclosure of which is hereby incorporated by reference), proposes to use the Received Signal Strength (RSS) of received data frames, along with the number of retransmissions, to estimate the channel condition. This algorithm does not require any coordination from the receiver and thus does not require a change to the IEEE 802.11 standard. However, this scheme assumes that the signal strength of the sending device is the same as the signal strength at the receiver. In other words, the scheme assumes that a symmetrical channel condition exists. As a result that is not a practical scheme.

What is needed is a rate adaptation scheme that readily adapts to the channel conditions of a WLAN system. Such a rate adaptation scheme should be relatively easy to implement without requiring changes or modifications to the IEEE 802.11 standard.

SUMMARY

In an embodiment, a flexible rate adaptation algorithm adjusts the data transmission rate mode based on channel conditions of a channel in a WLAN system. An embodiment of the present rate adaptation scheme further adjusts the calculation for determining an appropriate data transmission rate mode as channel conditions change. Furthermore, embodiments are basically an ARF style algorithm and scheme.

An embodiment provides a WLAN system that has a sending station and a receiving station. The sending station is programmed to send WLAN communications using an adaptive rate algorithm. The adaptive rate algorithm has a searching mode for searching for an appropriate data transmission rate mode, which provides the fastest, successful WLAN communication between the sending station and the receiving station. The adaptive rate algorithm also has a transmission mode wherein the data transmission rate mode remains constant until a predetermined number of unsuccessful transmission attempts occur. Furthermore, in the transmission mode, the transmission rate also remains constant until a predetermined number of successful transmissions occur thereby encouraging the exemplary transmission scheme to increase the data transmission rate to a higher data transmission rate mode.

Other embodiments provide a method of communicating in a WLAN system. The method of communicating includes a sending device that sends a data frame to a receiving device at a current data transmission rate mode (data rate). The sending device determines whether an acknowledge signal (ACK) is received at the sending device. If an ACK is received by the sending device, then a success threshold counter is incremented. If the success threshold counter becomes equal to a success threshold number (TH), then the current data transmission rate mode is increased to a new data transmission rate mode equal to ((the current data transmission rate mode number)+((the number of possible data transmission rate modes)−(the current data transmission rate mode number))÷2). The success threshold counter is also reset to zero. Conversely, if the success threshold counter is not equal to the success threshold number, then the success threshold counter is incremented by one and the next data frame is sent from the sending device to the receiving device.

Yet other embodiments provide a WLAN system that includes a sending device for sending wireless communications in a WLAN network on a channel. The sending device is configured or programmed to communicate in the WLAN system using a two phase communication algorithm. The two phases are a searching phase and a transmission phase such that an additive increase—multiplicative decrease (AIMD) algorithm is employed.

In an embodiment, a wireless LAN (WLAN) device operates to send WLAN communications and receive acknowledgments of said sent WLAN communications. The WLAN device has a configurable data transmission rate for the sent WLAN communications, the data transmission rate being selected in accordance with an adaptive rate algorithm. The adaptive rate algorithm functions to: increase the data transmission rate in response to receipt of a number of consecutive acknowledgments in excess of a success threshold; respond to an acknowledgment received immediately after increasing the data transmission rate by increasing the success threshold; respond to failure to receive the acknowledgment immediately after increasing the data transmission rate by increasing the success threshold and decreasing the data transmission rate; and respond to failure to receive the acknowledgment at instances other than immediately after increasing the data transmission rate by decreasing the success threshold and decreasing the data transmission rate.

In another embodiment, a wireless LAN (WLAN) device operates to send WLAN communications and receive acknowledgments of said sent WLAN communications. The WLAN device has a configurable data transmission rate for the sent WLAN communications, the data transmission rate having a plurality of settings selected in accordance with an adaptive rate algorithm. The adaptive rate algorithm functions to: increase the setting of the data transmission rate in response to receipt of a number of acknowledgments in excess of a success threshold, and decrease the setting of the data transmission rate in response to failure to receive the acknowledgment. The success threshold is increased in response to each increasing of the data transmission rate setting by the adaptive rate algorithm, and the success threshold is set to a fraction of the success threshold in response to decreasing of the data transmission rate setting by the adaptive rate algorithm.

In another embodiment, a wireless LAN (WLAN) device operates to send WLAN communications and receive acknowledgments of said sent WLAN communications. The WLAN device has a configurable data transmission rate for the sent WLAN communications and operates in a searching phase and a transmission phase. The data transmission rate is selected in accordance with an adaptive rate algorithm. When in the searching phase to search for a preferred data transmission rate, the algorithm functions to: increase the data transmission rate in response to receipt of a number of consecutive acknowledgments in excess of a success threshold; respond to an acknowledgment received immediately after increasing the data transmission rate by increasing the success threshold; exit the searching phase to enter the transmission phase with the increased data transmission rate as the preferred data transmission rate; respond to failure to receive the acknowledgment immediately after increasing the data transmission rate by increasing the success threshold and decreasing the data transmission rate; respond to failure to receive the acknowledgment at instances other than immediately after increasing the data transmission rate by decreasing the data transmission rate; and stay in the searching phase. When in the transmission phase to transmit WLAN communications at the preferred data transmission rate, the algorithm functions to: increase the data transmission rate in response to receipt of a number of consecutive acknowledgments in excess of a success threshold; respond to an acknowledgment received immediately after increasing the data transmission rate by increasing the success threshold; respond to failure to receive the acknowledgment immediately after increasing the data transmission rate by increasing the success threshold, decreasing the data transmission rate and exiting the transmission phase to enter the searching phase; and respond to failure to receive the acknowledgment at instances other than immediately after increasing the data transmission rate by decreasing the data transmission rate and exiting the transmission phase to enter the searching phase.

BRIEF DESCRIPTION OF THE DRAWINGS

The disclosed invention will be described with reference to the accompanying drawings, which show important sample embodiments of the invention and which are incorporated in the specification hereof by reference, wherein.

DETAILED DESCRIPTION OF THE DRAWINGS

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

WLAN topology is fairly straight forward. WLANs allow workstations (or any device with wireless capability) to communicate and to access a network using radio propagation as the transmission medium. A WLAN can be connected to an existing wired LAN as an extension, or can form the basis of a new network. While adaptable to both indoor and outdoor environments, WLANs are especially suited to indoor locations such as office buildings, manufacturing floors, homes, hospitals, and universities.

Figure 1:
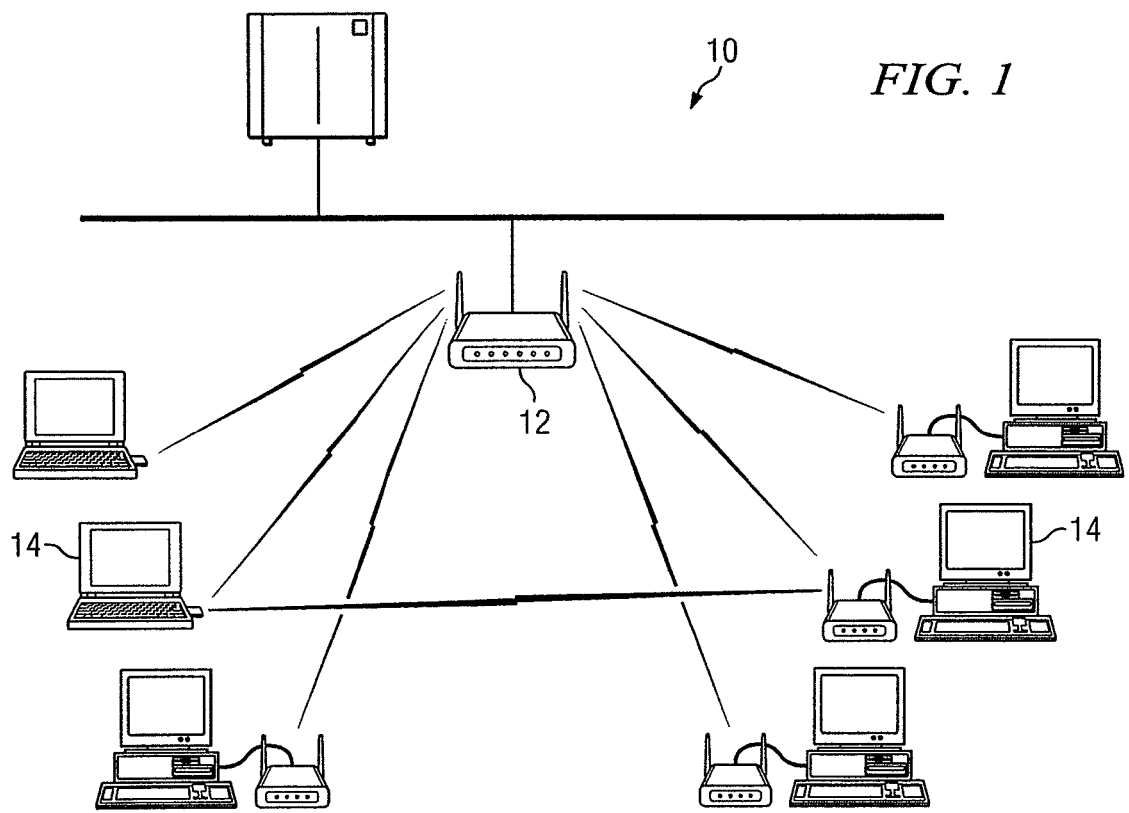
FIG. 1 is a is a WLAN configuration.

The basic building block of a WLAN is a "cell". The cell is the area in which wireless communication takes place. The coverage area of a cell depends on the strength of the propagated radio signal and the type of the construction of the walls, partitions, and other physical characteristics and electronic noise of the environment. PC-based workstations, notebook and pen-based computers, printers and other WLAN networkable devices can move freely in the cell. FIG. 1 depicts a basic WLAN cell 10. Each wireless LAN cell requires some communications and traffic management. The communication and traffic management is generally coordinated by an access point (AP) 12, which communicates with each wireless station 14 in its coverage area. A station 14 may also communicate with another station 14 via the AP 12 or without the AP when one station is acting as an AP. The AP 12 may also function as a bridge between the wireless stations 14 and a wired network and other wireless cells (not shown). Connecting an AP 12 to a backbone or to other wireless cells can be accomplished by wire or by a separate wireless link, using wireless bridges. The range of the system or network can be extended by cascading several wireless links, one after another.

The IEEE 802.11 protocol, which is used for WLAN communications allows for dynamic rate switching. The data rate of each station 14 is adjusted according to the channel condition. Performance (i.e., throughput of data) is maximized by increasing the data rate, but at the same time keeping re-transmissions of data to a minimum. This is very important for WLAN mobile applications where the signal quality fluctuates rapidly.

Embodiments described herein require little or no modification to the IEEE 802.11 standard and are relatively simple to incorporate into a device. Embodiments of the present rate adaptation mechanism are extremely dynamic by supporting the higher transmission rates in good channel conditions and by working well in all types of channel conditions without becoming unstable. The embodiments are also scalable for future IEEE 802.11 upgrades.

The rate adaptation mechanisms focus on adaptation algorithms that do not need feedback information or a central control station that is not already part of the IEEE 802.11 standard. If a sending station does not receive an ACK back in response to a data frame sent to a certain receiving station, the sending station will assume that the channel condition is deteriorating or there is packet collision. On the other hand, if the sending station succeeds in receiving several ACKs in a row from the receiving station, the sending station might be able to assume that the channel condition is improving and a higher data rate (data transmission rate mode) may be feasible.

Analysis of previously proposed ARF algorithms revealed that their performance is somewhat dependent on two key parameters: (1) the choice of the threshold value (i.e., after how many consecutively received ACKs should the sending station increase the data transmission rate mode; and, after how many missed ACKs should the data transmission rate mode be reduced); and (2) how to search for the optimum data transmission rate and how to know when the optimum data transmission rate is reached.

In previous ARF rate adaptation schemes, there appear to be two important values that affect their performance: the Failure Threshold (FT) and the Success Threshold (ST). The FT value stands for the number of unreceived ACKs in a row before the transmission rate is decreased by the sending station. The ST value stands for the number of consecutively received ACKs by the sending station before the transmission rate is increased.

Another important value is the way and by how much the transmitting rate is increased or decreased when the ST or FT value is reached.

Using a single fixed value for the ST is very, perhaps overly, sensitive to the rate that a channel's condition changes. A rate adaptation algorithm can be provided with two fixed ST values, one value for when the current channel condition is in a higher Doppler Spread value and the other ST value used when the channel condition in a lower Doppler spread value. It was noted that an ARF algorithm using two fixed values of ST performed better than one with a single value for ST, but a two value ST adaptive algorithm is still not very adaptive to differing channel conditions. For example, if the channel condition is stable and the current data transmission rate is already the best successful rate, at this rate prior art adaptive algorithm will periodically and after a fixed number of successful data transmissions attempt to increase the data transmission rate to the next higher rate. Increasing the data transmission rate will cause a data transmission error such that the sending station will not receive an ACK back from the receiving station. Then, the channel rate will be decreased back to the best successful rate. This channel transmission rate fluctuation decreases the data throughput on the channel. It would be better to raise the ST value when a best successful rate is found in order to minimize undesired rate increase attempts.

Furthermore, a value of FT that is too high also degrades the overall data throughput of a channel. Various values for FT were simulated and it was found that if FT should be fixed, the best value for FT is 1. Some previous ARF adaptive rate algorithms the FT value was set to, for example, 4 and then the data transmission rate was simply decreased by 1 after the FT value was reached. Conversely, in embodiments of the present rate adaptive algorithm, a binary search method is used to better adapt the ST and FT values to channel conditions.

Through additional simulation and testing, it was observed that there is a correspondence between the nature of changing channel conditions in WLANs and the nature of changing congestion conditions on the Internet. This observation was new and unexpected because it deviates greatly from how previous WLAN rate adaptation algorithms operate. It was discerned that an ARF rate adaptation scheme, in accordance with embodiments described herein (through the proper setting of ST and FT thresholds), should be both dynamic and stable much like TCP congestion control algorithms handle congestion in Internet communications. To date no one has thought to utilize anything like a TCP algorithm for a WLAN environment.

As such, embodiments of the present adaptive rate algorithm use a very modified form of Additive Increase—Multiplicative Decrease (AIMD). AIMD is used in TCP functions on the Internet to get window sizes for TCP congestion control in Internet communications. In embodiments of the present rate adaptation algorithm the threshold settings ST and FT are changed and made adaptive to WLAN channel conditions using a type of AIMD mechanism. Other embodiments may use a Multiplicative Increase—Multiplicative Decrease (MIMD) algorithm to adjust threshold settings. Other embodiments may use a combination of an AIMD and MIMD algorithm to set and/or adjust the threshold conditions.

In an exemplary embodiment of the present rate adaptation mechanism threshold values, like ST, are dynamically updated as follows. If a WLAN channel transmission success immediately follows a transmission data rate mode increase, then the ST value is increased in order to avoid transmission failure caused by increasing the transmission rate to a higher mode in rapid succession. Further, if a transmission failure occurs immediately after a transmission rate mode increase, then the ST value is increased in order to discourage another transmission rate mode increasing attempt.

Embodiments of the present adaptive rate mechanism start with an initial threshold value TH. When the condition is satisfied for increasing the threshold, then TH is increased by adding a predetermined number $\alpha$. Similarly, when the condition is satisfied for decreasing the threshold, then TH is divided by a predetermined number $\beta$ each time.

In summary, an exemplary rate adaptation scheme for a WLAN device adapts the threshold TH. TH is initially set at a predetermined number.

1. When transmitting successfully at a given data transmission rate, and the TH condition of successful ACKs has been reached, then TH is incremented by an amount $\alpha$ (TH=TH+$\alpha$). Through experimentation and simulation, shown below, a preferred $\alpha$ is equal to 16, but can be in the range of 1 to 30.

2. When transmitting successfully at a given data transmission rate and no ACK is received by the sending station, then TH is decremented by dividing TH by $\beta$ (TH=TH/$\beta$) through experimentation and simulation, shown below, a preferred $\beta$ is equal to 2, but can be in the range of 1 to 10.

Table 1 depicts the operating ST values of an existing IBM WLAN ARF adaptive rate algorithm (the IBM algorithm) compared with the TH values of an exemplary algorithm:

TABLE 1

| | Data Transmission Rate | | | | | | | |
|---|---|---|---|---|---|---|---|---|
| | 6 Mbps | 9 Mbps | 12 Mbps | 18 Mbps | 24 Mbps | 36 Mbps | 48 Mbps | 54 Mbps |
| IBM | 10 | 10 | 9.51 | 9.88 | 9.10 | 9.79 | 8.65 | N/A |
| Present Exemplary Algorithm | 7 | 12.48 | 26.3 | 39.1 | 41.9 | 55.5 | 65.5 | N/A |

Note that the TH values for the present exemplary algorithm are dynamic and track the respective channels' condition as much as possible. On the other hand, the IBM algorithm (and others) have their ST thresholds set irrespective of channel conditions and data transmission rate.

When transmission is successful enough in a channel such that the TH threshold is reached (the requisite number of consecutive ACKs have been received by the sending station), the appropriate data transmission mode must be determined. The simplest thing to do is to increase the transmission data rate mode by 1. In embodiments of the algorithm, a binary search method is used. The binary search method is used when a threshold TH has been reached successfully (i.e., when the TH number of consecutive ACKs has been achieved). When there is a failure threshold, and it has been reached, then the data transmission rate is decreased by 1. The rational is to locate the optimal data transmission rate as soon as possible.

When performing the binary search, and a successful threshold is reached, the data transmission rate mode is set to a data transmission rate mode in the middle of the previous data transmission rate mode and the highest possible data transmission rate mode (which is presently 8). For example, if the previous data transmission rate mode is 4, then the new data transmission rate mode will be (4+8)÷2=6. If the next transmission is a failure (i.e., no ACK) then the data transmission rate mode is decreased by 1. Following the example, the new data transmission rate mode is 6−1=5. When the first transmission in a new data transmission rate mode is successful, then the binary searching phase stops and a transmission phase begins.

The exemplary rate adaptation algorithm of the present invention can be divided into two phases; the searching phase and the transmission phase. The exemplary algorithm starts with the searching phase and then shifts to the transmission phase when the first transmission in a new transmission mode is successful (i.e., an ACK is received by the sending station). The exemplary algorithm will stay in the transmission phase until a failure (i.e., No ACK) occurs or a success threshold TH is reached.

Figure 2:
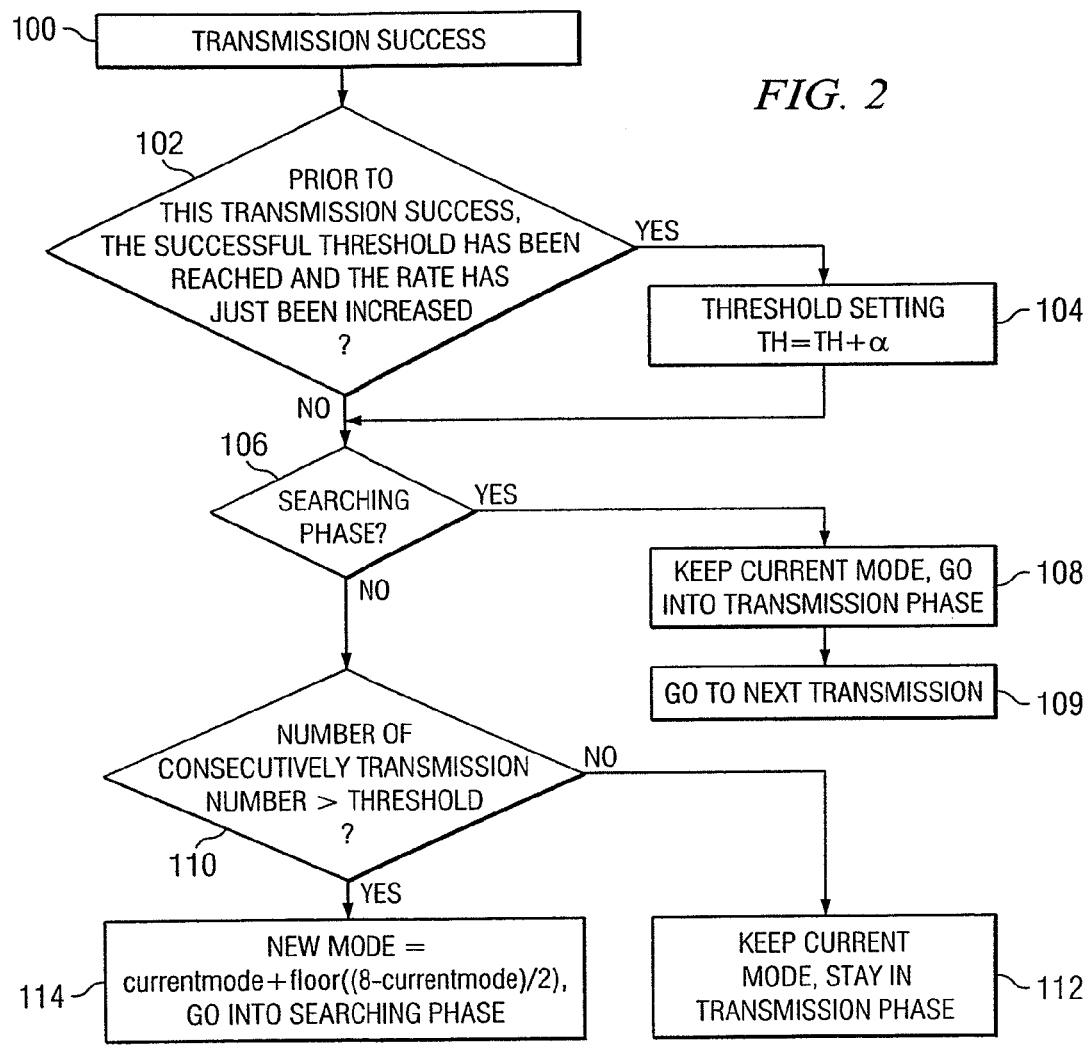
FIG. 2 is a flow chart of a transmission success scheme according to an embodiment.

Referring now to FIG. 2, FIG. 2 is a flow chart depicting how an exemplary rate adaptation algorithm for a WLAN device operates. Since an exemplary rate adaptation algorithm has two types of transmission, transmission success and transmission failure, FIG. 2 depicts transmission success. At step 100 a transmission success on a WLAN communication just occurred. In other words, an ACK was received by the sending station indicating that the receiving station received the transmitted data or data frame. At step 102 it is determined whether, just prior to the successful transmission of step 100, a successful threshold TH had been reached and the data transmission rate mode had just been increased. If the answer is yes then at step 104 the success threshold TH is increased by $\alpha$ (i.e., TH=TH+$\alpha$). If the answer is no, then it must be determined whether the algorithm is in the searching phase at step 106. If the rate adaptation algorithm is in the searching phase, it should keep or stay at the present data transmission rate mode and switch to the transmission phase (step 108). If at step 106 the exemplary rate adaptation is not in the searching phase, but instead is already in the transmission phase, then at step 110 it is determined whether the number of consecutive successful transmissions (i.e., successful ACKs) is greater than the present value of the threshold TH. If the number of successful and consecutive ACKs is less than TH, then, at step 112, the current data transmission mode is kept and the transmission phase continues. On the other hand, if at step 110, the number of consecutively successful transmissions is greater than the threshold value TH, then, at step 114, a new data transmission rate mode is selected. The new data transmission rate mode is equal to (the current mode number+((the total number of available modes)−(current mode number)÷2)). Since the present total number of available data transmission rate modes is presently 8, then when the calculation is done, the resulting answer may not be an integer (i.e., whole number). Thus, embodiments of the present invention may round-up, round-down, use the integer value or round to the higher whole number in order to calculate the new mode. For example, if the total number of available transmission modes is 8 and the present transmission mode is 3 and the TH has met the new mode calculation of step 14 which is new mode=3+((8−3)÷2)=5.5, thus, depending on the embodiment of the present invention, the new data transmission mode can be mode 5 or 6.

Figure 3:
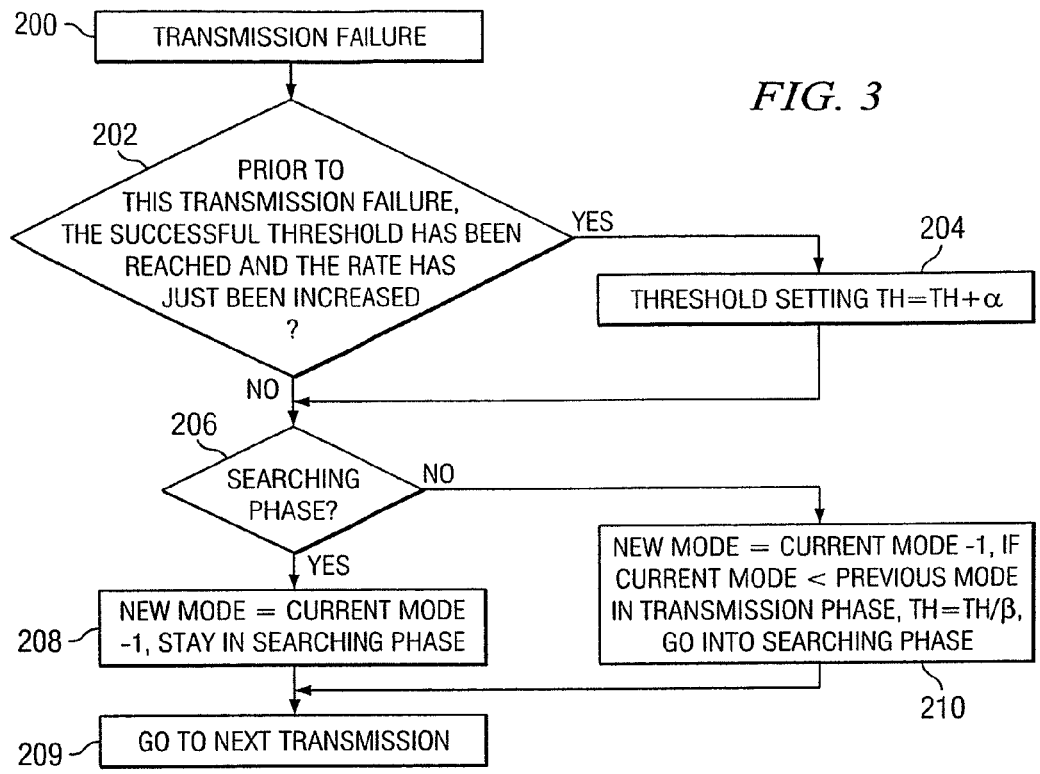
FIG. 3 is a flow chart of a transmission failure scheme according to an embodiment.
Figure 4:
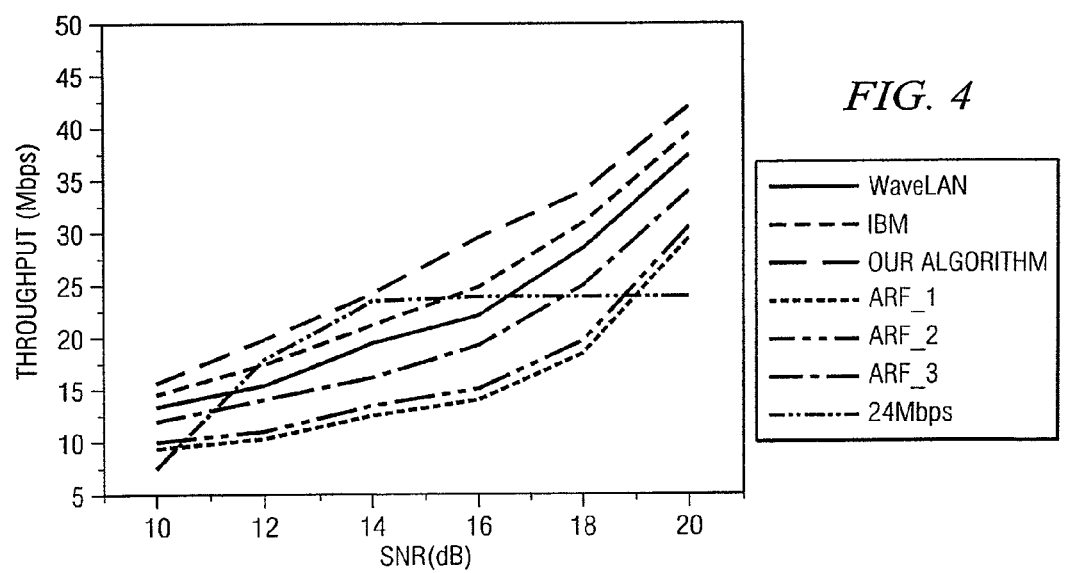
FIG. 4 is a chart showing the data throughput improvement (%) of an embodiment compared to prior algorithms when conditions of Flat Fading with a Doppler spread of 1 Hz are present.
Figure 5:
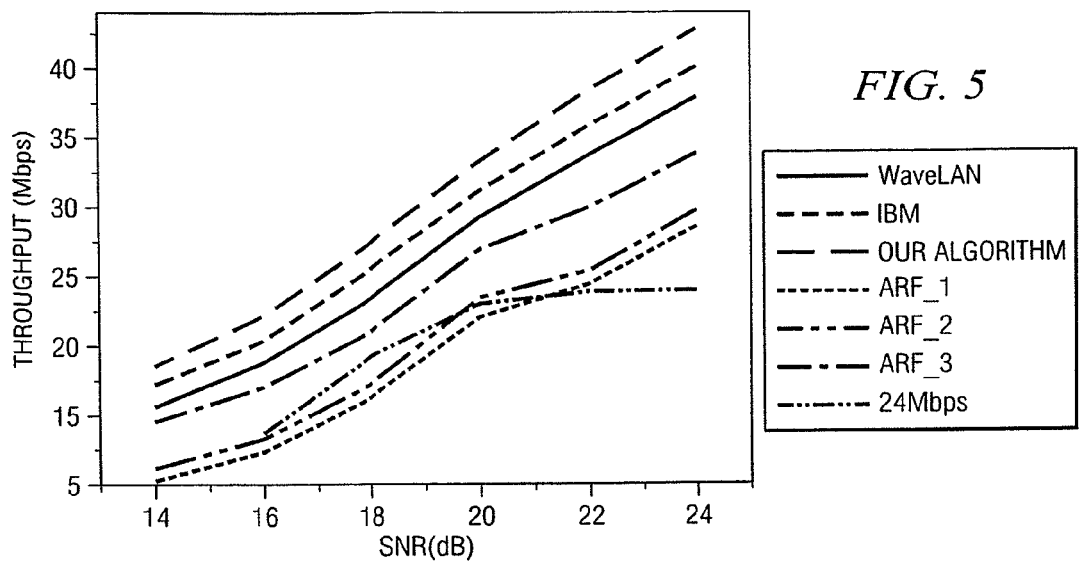
FIG. 5 is a chart showing the data throughput improvement (%) of an embodiment compared to prior algorithms when conditions of Flat Fading with a Doppler spread of 5 Hz are present.
Figure 6:
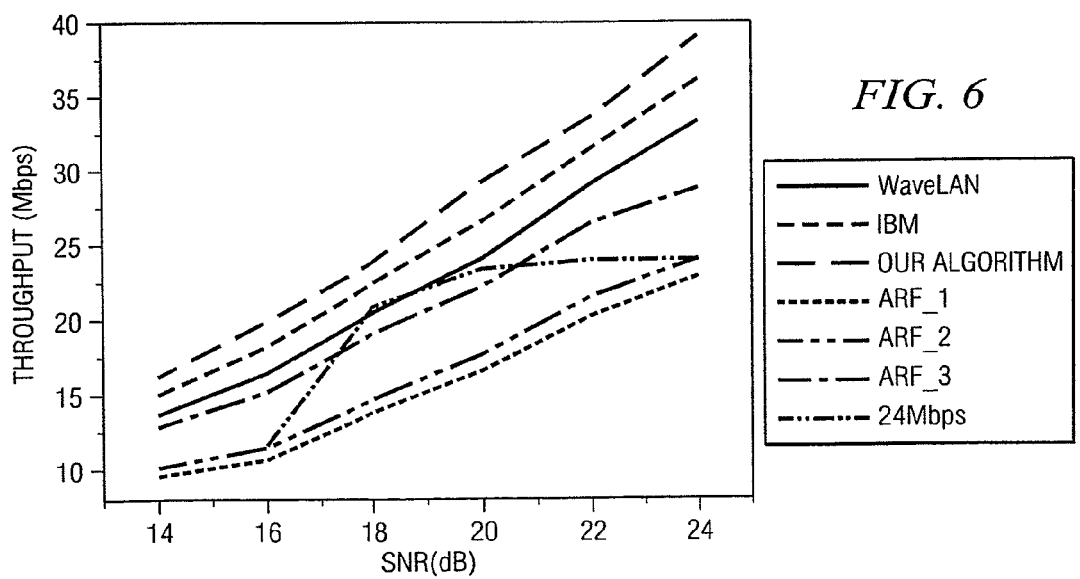
FIG. 6 is a chart showing the data throughput improvement (%) of an embodiment compared to prior algorithms when conditions of Flat Fading with a Doppler spread of 10 Hz are present.
Figure 7:
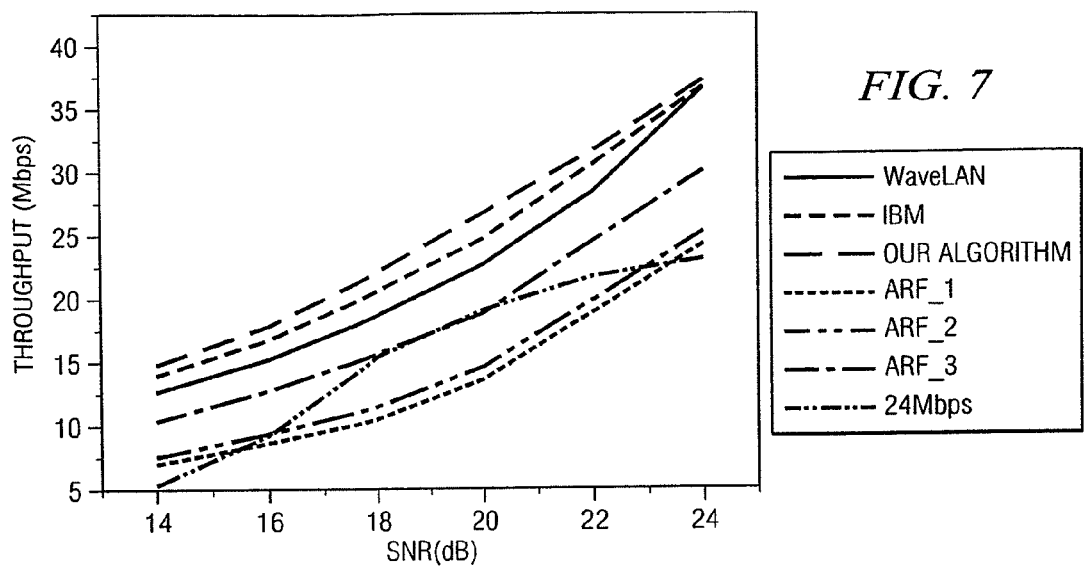
FIG. 7 is a chart showing the data throughput improvement (%) of an embodiment compared to prior algorithms when conditions of Flat Fading with a Doppler spread of 20 Hz are present.

Now referring to a transmission failure event (i.e., No ACK received) we look at FIG. 3. At step 200 a transmission failure occurs in the channel and an ACK is not received by the transmitting station. At step 202 it is determined whether the transmission just prior to this transmission failure, was the threshold TH reached and the data transmission rate just been increased to a new data transmission rate mode, then a new success threshold is set as TH=TH+$\alpha$. If in the transmission just prior to this transmission failure, the TH threshold was not reached, then at step 206 it is determined whether the exemplary algorithm is in searching phase. If the exemplary algorithm is in searching mode and a transmission failure occurred, then, at step 208 a new data transmission rate mode is set to the current mode minus 1 and the algorithm stays in the searching phase for the next transmission at step 209.

If at step 206, the exemplary algorithm is not in the searching phase, then at step 210 the data transmission rate mode is set to a new data transmission rate mode equal to the current data transmission rate mode minus 1 and a new searching phase is started. The algorithm goes to the next transmission at step 209 to find out whether it will be a success or failure. Furthermore, if at step 210, the current data transmission mode rate is less than the previous mode then the threshold TH is reset to TH=TH/$\beta$ and the exemplary algorithm goes into a new search phase.

In other embodiments of the invention, the success threshold TH is adjusted by either an AIMD or MIMD algorithm. Other embodiments set a maximum value for the success threshold TH. For example, a maximum value for a success threshold TH might be a number between 20 and 200. As such, regardless of the success rate of communication, the TH cannot go above fixed present maximum value. Furthermore, a minimum value of TH can be set. For example, regardless of the failure rate, the value for TH may not be able to go below some fixed minimum value. A range for the minimum TH value may be between 1 and 10.

The exemplary adaptive data rate scheme adapts its thresholds to WLAN channel conditions using a dynamic technique that is somewhat similar to the TCP AIMD scheme, but has never been used with WLAN systems. Furthermore, compared with previous ARF or adaptive rate adjustment schemes, embodiments of the present invention achieve better throughput performance (shown below) than any static threshold or near static threshold ARF WLAN rate adjustment schemes.

Exemplary adaptive rate schemes for WLAN are more complicated than the Internet's TCP techniques because in the exemplary rate adaptive schemes both the threshold number TH and the data transmission rate mode must be determined, rather than just the threshold. In the Internet's TCP, the threshold (window) determines the rate.

Embodiments are easily implemented within the current IEEE 802.11 standard. The transmitter (i.e., sending station 14) needs to maintain for a certain MAC address two counters. One counter for counting successful transmissions (i.e., ACK received) and a second counter for counting failed transmissions (i.e., no ACK received). If a frame of data is successfully transmitted, the success counter is incremented by one and the failure counter is reset to zero. Similarly, if a frame of data is unsuccessfully transmitted, the failure counter is incremented by one and the success counter is reset to zero. If the failure counter reaches a predetermined threshold value FT, then the data transmission rate for the corresponding destination is decreased and the failure counter is reset to zero. Similarly, if the success counter reaches a predetermined threshold value TH, then the data transmission rate is increased and the success counter is reset to zero.

Embodiments are not limited to usage on a WLAN environment, but an exemplary rate adaptation algorithm can be applied to any device with a wireless communication ability.

The performance of exemplary rate adaptation algorithms were investigated using discrete-event simulations. The simulator was built using MATLAB with Simulink, communications toolbox, communications blockset, DSP blockset and signal processing tool box software. The simulator models the 802.11 a PHY and MAC layers.

Stationary nodes were considered in the simulation. A fixed transient power level was assumed along with the assumption that the link SNR (signal-to-noise ratio) can be specified on the fly. The Jakes' simulation model was used to implement the multipath Rayleigh Fading Channel. The simulation allowed for the maximum Doppler shift to be specified before running an algorithm.

An end-to-end physical layer and 4 modulation schemes with 8 data transmission rate modes were implemented. The 8 data transmission rate modes were 6, 9, 12, 18, 24, 36, 48, and 54 Mb/s. In the simulation, it was assumed that random data transmissions occurred without data scrambling. The bit err rate (BER) was obtained by simulation.

Table 2 shows the parameters used in an exemplary algorithm of a simulation.

TABLE 2

Parameters used in the PHY layer simulation

| | |
|---|---|
| OFDM symbols per Transmission Block | 20 |
| Number of OFDM symbols in training sequence | 4 |
| Viterbi traceback depth | 34 |
| Symbol period (second) | 0.08e−6 |
| Initial Success Threshold | 16 |
| Failure Threshold | 1 |
| Addition $\alpha$ | 16 |
| Division $\beta$ | 2 |

Table 3 shows the parameters used in the simulation of the MAC layer

TABLE 3

Parameters used in the MAC layer simulation

| | | |
|---|---|---|
| tSlotTime | 9μ | Slot time |
| tSIFSTime | 16 μs | SIFS time |
| tDIFSTime | 34 μs | DIFS time |
| aCWmin | 15 | Min contention window size |
| aCWmaz | 1023 | Max contention window size |
| tPLCPPreamble | 16 μs | PLCP preamble duration |
| tPLCP_SIG | 4 μs | PLCP SIGNAL field duration |
| tSymbol | 4 μs | OFDM symbol internal |

In the MAC layer, only the distributed coordination function (DCF) is considered. Only data packets and some control frames (RTS, CTS, ACK) necessary for the DCF are considered. In the simulation, the performance of the exemplary rate adaptation algorithm was compared to that of the IBM algorithm, the WaveLAN algorithm and the following three ARF algorithms:

ARF_1: After 4 missed ACKS in a row, this algorithm goes into fallback state (decreases the transmission rate mode by one); then after 5 consecutive ACKs recovering by (increasing the data transmission rate mode.

ARF_2: After 4 missed ACKs in a row, this algorithm goes into fallback state; then after 5 consecutive ACKs are received, a probation state is entered. If the next ACK is missed, then this algorithm goes back to the fallback state, otherwise it begins recovering.

ARF_3: This test algorithm is similar to ARF_2, except 11 Acks are required consecutively to go into recovery.

In order to cover a wide variety of WLAN networking environments, experiments were performed with the following varying parameters: 1) differing channel models: flat fading, non-flat fading, and dispersive fading; 2) different Doppler spreads: 1 Hz, 5 Hz, 10 Hz, and 20 Hz; 3) different packet collision conditions: no collision and with collision; 4) different SNR values: from 8 dB to 24 dB; 5) single sender and multiple sender; and 6) comparison of the exemplary rate adaptation algorithm with "signal measurement": base schemes.

The following tables and associated figures present results of the comparative experiment in the various networking environments. The tables provide the overall differenced performance between an exemplary adaptive rate algorithm and other algorithm/schemes. It should be noted that in all circumstances, the present exemplary embodiment performed better by providing a higher average throughput in Mbps than any of the competing algorithms and schemes.

FIGS. 4, 5, 6 and 7 provide a graph showing the data throughput in Mbps v. SNR in dB for various tested algorithms, including an exemplary rate adaptation algorithm, with flat fading/Doppler spread=1 Hz, 5 Hz, 10 Hz, and 20 Hz, respectively. Tables 4, 5, 6, and 7 provide the throughput in Mbps of each algorithm and the percent (%) improvement throughput of an exemplary rate adaptation algorithm over the other tested algorithms.

TABLE 4

Throughput improvement (%) of present algorithm with respect to other algorithms
FLAT Fading/Doppler Spread - 1 Hz

| SNR | IBM | WaveLAN | ARF_1 | ARF_2 | ARF_3 | 24 Mbps |
|---|---|---|---|---|---|---|
| 10 dB | 7 | 16.2 | 67 | 55.5 | 30.6 | 105 |
| 12 dB | 13.9 | 28.5 | 87.1 | 71.6 | 39.6 | 11 |
| 14 dB | 14.2 | 24.5 | 89.1 | 74.5 | 48.3 | 2.6 |
| 16 dB | 19.2 | 33.1 | 103.2 | 91.3 | 49.1 | 23.4 |
| 18 dB | 9.3 | 18.2 | 79.1 | 68 | 34 | 40 |
| 20 dB | 6.7 | 12.3 | 42.3 | 37.7 | 23.8 | 75.6 |
| Average Increased Throughput | 11.72% | 22.1% | 77.97% | 66.25% | 37.52% | 42.93% |

TABLE 5

Throughput improvement (%) of present algorithm with respect to other algorithms
FLAT Fading/Doppler Spread - 5 Hz

| SNR | IBM | WaveLAN | ARF_1 | ARF_2 | ARF_3 | 24 Mbps |
|---|---|---|---|---|---|---|
| 14 dB | 8.12 | 19.59 | 80.14 | 65.189 | 26.97 | 135.67 |
| 16 dB | 9.29 | 18.46 | 80.19 | 66.92 | 30.51 | 62.04 |
| 18 dB | 7.64 | 18.17 | 67.48 | 58.44 | 29.69 | 41.45 |

TABLE 5-continued

Throughput improvement (%) of present algorithm with respect to other algorithms
FLAT Fading/Doppler Spread - 5 Hz

| SNR | IBM | WaveLAN | ARF_1 | ARF_2 | ARF_3 | 24 Mbps |
|---|---|---|---|---|---|---|
| 20 dB | 8.61 | 16.31 | 49.82 | 41.58 | 22.83 | 44.10 |
| 22 dB | 9.04 | 15.97 | 57.53 | 51.57 | 28.16 | 61.02 |
| 24 dB | 8.43 | 13.55 | 48.99 | 43.53 | 26.33 | 77.92 |
| Average Increased Throughput | 8.53% | 17.34% | 64.03% | 54.54% | 27.42% | 70.37% |

TABLE 6

Throughput improvement (%) of present algorithm with respect to other algorithms
FLAT Fading/Doppler Spread - 10 Hz

| SNR | IBM | WaveLAN | ARF_1 | ARF_2 | ARF_3 | 24 Mbps |
|---|---|---|---|---|---|---|
| 14 dB | 9.23 | 18.80 | 70.32 | 60.59 | 26.26 | 239.59 |
| 16 dB | 10.23 | 21.36 | 86.92 | 74.67 | 30.72 | 73.31 |
| 18 dB | 7.43 | 16.34 | 72.66 | 63.04 | 25.00 | 14.29 |
| 20 dB | 11.12 | 21.74 | 76.05 | 64.89 | 31.84 | 25.27 |
| 22 dB | 7.96 | 15.60 | 66.50 | 56.48 | 27.07 | 40.83 |
| 24 dB | 9.23 | 17.08 | 71.03 | 62.59 | 36.02 | 63.33 |
| Average Increased Throughput | 9.20% | 18.49% | 73.91% | 63.71% | 29.48% | 76.10% |

TABLE 7

Throughput improvement (%) of present algorithm with respect to other algorithms
FLAT Fading/Doppler Spread - 20 Hz

| SNR | IBM | WaveLAN | ARF_1 | ARF_2 | ARF_3 | 24 Mbps |
|---|---|---|---|---|---|---|
| 14 dB | 7.87 | 18.35 | 111.43 | 96.29 | 42.86 | 179.25 |
| 16 dB | 8.82 | 19.34 | 108.09 | 90.46 | 40.19 | 93.55 |
| 18 dB | 9.47 | 20.30 | 110.97 | 92.91 | 41.23 | 42.95 |
| 20 dB | 11.03 | 19.93 | 95.02 | 83.62 | 42.55 | 39.96 |
| 22 dB | 5.66 | 12.99 | 66.84 | 59.38 | 29.02 | 45.21 |
| 24 dB | 2.63 | 2.63 | 53 | 46.97 | 23.63 | 60.98 |
| Average Increased Throughput | 7.58% | 15.76% | 91.04% | 78.27% | 36.58% | 76.98% |

Figure 8:
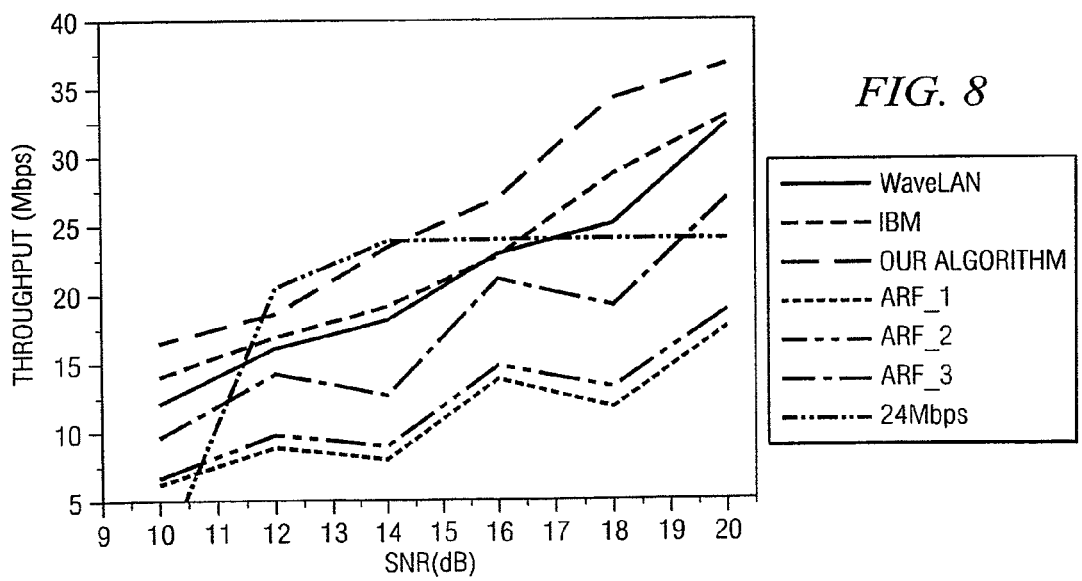
FIG. 8 is a chart showing the data throughput improvement (%) of an embodiment compared to prior algorithms when conditions of Flat Fading with a Doppler spread of 1, 5, 10 and/or 20 Hz.

FIG. 8 provides a graph showing the data throughput in Mbps v. SNR in dB for various tested algorithms, including an exemplary rate adaptation algorithm, with no fading channel (Doppler spread=1, 5, 10 and 20 HZ). Table 8 provides the throughput in Mbps of each algorithm tested and the percent (%) improvement throughput of an exemplary rate adaptation algorithm over the other algorithms.

TABLE 8

Throughput improvement (%) of present algorithm with respect to other algorithms
Flat Fading/Doppler Spread - 1 Hz, 5 Hz, 10 Hz, and 20 Hz

| SNR | IBM | WaveLAN | ARF_1 | ARF_2 | ARF_3 | 24 Mbps |
|---|---|---|---|---|---|---|
| 10 dB | 16.94 | 36.25 | 166.13 | 146.27 | 70.63 | 1962.50 |
| 12 dB | 9.68 | 15.01 | 110.11 | 90.82 | 31.41 | −10.82 |
| 14 dB | 22.27 | 29.48 | 193.02 | 162.57 | 83.88 | −2.00 |
| 16 dB | 18.21 | 17.39 | 94.24 | 82.21 | 28.21 | 12.50 |
| 18 dB | 19.57 | 37.05 | 189.32 | 158.26 | 77.87 | 43.33 |
| 20 dB | 11.52 | 13.13 | 107.91 | 94.61 | 36.30 | 53.33 |
| Average Increased Throughput | 16.36% | 24.72% | 143.46% | 122.28% | 54.72% | 343.14% |

Figure 9:
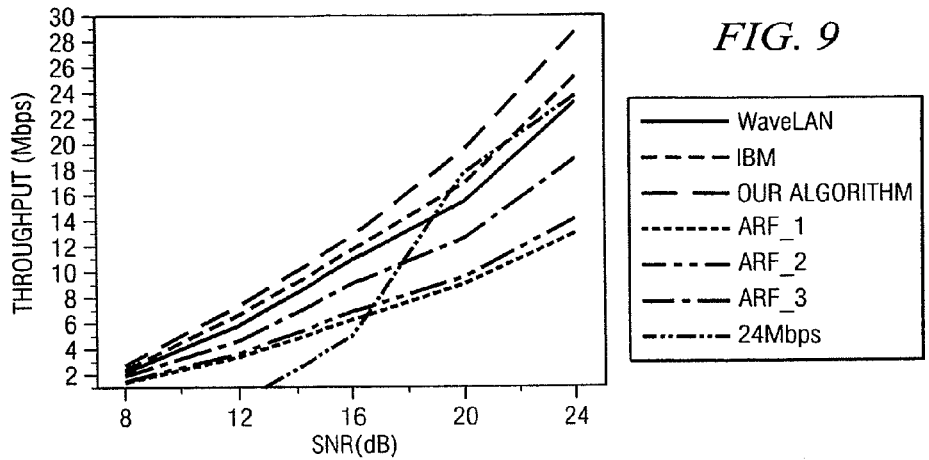
FIG. 9 is a chart showing the data throughput improvement (%) of an embodiment compared to prior algorithms when conditions of Dispersive Fading with a Doppler spread of 1 Hz are present.
Figure 10:
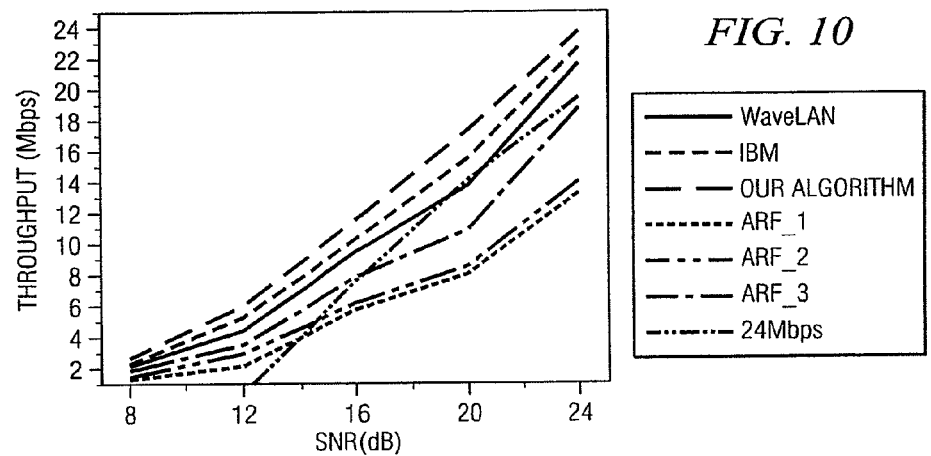
FIG. 10 is a chart showing the data throughput improvement (%) of an embodiment compared to prior algorithms when conditions of Dispersive Fading with a Doppler spread of 5 Hz are present.
Figure 11:
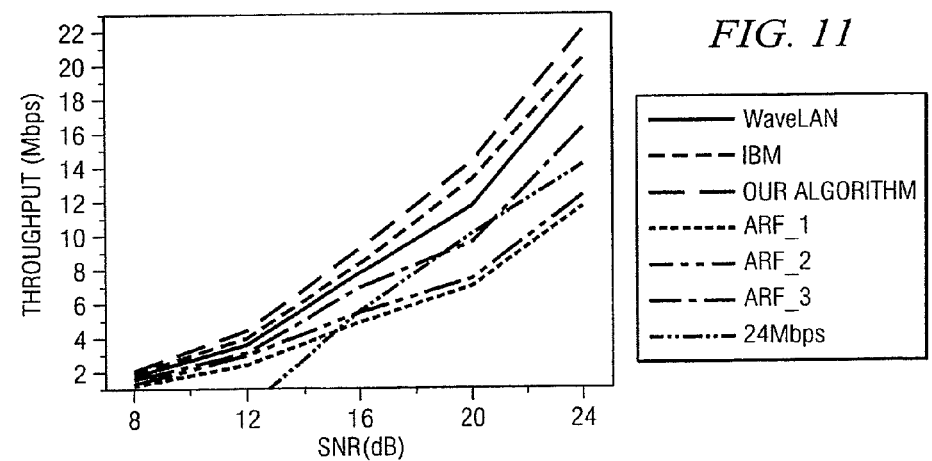
FIG. 11 is a chart showing the data throughput improvement (%) of an embodiment compared to prior algorithms when conditions of Dispersive Fading with a Doppler spread of 10 Hz are present.

FIGS. 9, 10 and 11 each provide a graph showing the data throughput in Mbps v. SNR in dB for various tested algorithms, including an exemplary embodiment of the present invention (our algorithm), with dispersive fading/Doppler spread=1 Hz, 5 Hz, and 10 Hz, respectively. Tables 9, 10 and 11, below, provide the throughput in Mbps of each algorithm tested and the percent (%) improvement throughput of the exemplary embodiment with respect to the other tested algorithms having dispersive fading and Doppler spreads of 1, 5, and 10 Hz, respectively.

TABLE 9

Throughput improvement (%) of present algorithm with respect to other algorithms
DISPERSIVE Fading/Doppler Spread - 1 Hz

| SNR | IBM | WaveLAN | ARF_1 | ARF_2 | ARF_3 | 24 Mbps |
|---|---|---|---|---|---|---|
| 8 dB | 12.5 | 22.73 | 92.86 | 80 | 42.11 | N/A |
| 12 dB | 11.28 | 26.28 | 117.65 | 104.42 | 59.83 | N/A |
| 16 dB | 8.75 | 16.35 | 103.17 | 85.51 | 40.66 | 152.96 |
| 20 dB | 15.88 | 26.28 | 116 | 105.21 | 55.12 | 10.06 |
| 24 dB | 13.97 | 23.08 | 121.54 | 102.82 | 52.38 | 20.50 |
| Average Increased Throughput | 12.48% | 22.95% | 110.25% | 95.59% | 50.12% | 61.17% |

TABLE 10

Throughput improvement (%) of present algorithm with respect to other algorithms
DISPERSIVE Fading/Doppler Spread - 5 Hz

| SNR | IBM | WaveLAN | ARF_1 | ARF_2 | ARF_3 | 24 Mbps |
|---|---|---|---|---|---|---|
| 8 dB | 13.85 | 24.06 | 100.76 | 85.21 | 43.72 | N/A |
| 12 dB | 14.07 | 36.05 | 185.71 | 104.48 | 70.45 | N/A |
| 16 dB | 12.19 | 21.59 | 100.69 | 86.80 | 46.84 | 51.83 |
| 20 dB | 11.75 | 25.90 | 117.50 | 102.80 | 60 | 22.54 |
| 24 dB | 4.92 | 9.13 | 79.16 | 69.62 | 26.46 | 21.94 |
| Average Increased Throughput | 11.36% | 23.35% | 116.77% | 89.58% | 49.51% | 31.1% |

TABLE 11

Throughput improvement (%) of present algorithm with respect to other algorithms
DISPERSIVE Fading/Doppler Spread - 10 Hz

| SNR | IBM | WaveLAN | ARF_1 | ARF_2 | ARF_3 | 24 Mbps |
|---|---|---|---|---|---|---|
| 8 dB | 5.26 | 12.99 | 70.94 | 60 | 27.39 | N/A |
| 12 dB | 11.75 | 23.14 | 85.48 | 50 | 43.73 | N/A |
| 16 dB | 10.18 | 17.35 | 87.76 | 67.27 | 31.81 | 66.67 |
| 20 dB | 7.96 | 21.45 | 105.43 | 91.48 | 49.33 | 41.54 |
| 24 dB | 8.89 | 15.01 | 89.30 | 79.84 | 36.39 | 57.04 |
| Average Increased Throughput | 8.81% | 17.99% | 87.78% | 69.72% | 37.73% | 55.08% |

In other experiments it was determined that embodiments of the present invention provide a 9.15% throughput improvement over the IBM algorithm in conditions of flat fading with collisions and a Doppler spread of 5 Hz. Embodiments of the present invention, in yet other experiments, showed an average 14.68% throughput improvement over the IBM algorithm when there existed flat fading with multiple nodes and a Doppler spread of 5 Hz.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

The invention claimed is:

1. A method for selecting a configurable data transmission rate for a wireless LAN (WLAN) device which operates to send WLAN communications and receive acknowledgments of said sent WLAN communications, comprising:

increasing the data transmission rate in response to receipt of a number of consecutive acknowledgments in excess of a success threshold;

responding to an acknowledgment received immediately after increasing the data transmission rate by increasing the success threshold;

responding to failure to receive the acknowledgment immediately after increasing the data transmission rate by increasing the success threshold and decreasing the data transmission rate;

responding to failure to receive the acknowledgment at instances other than immediately after increasing the data transmission rate by decreasing the success threshold and decreasing the data transmission rate.

2. The method of claim 1, wherein increasing the success threshold comprises adding a predetermined constant amount ($\alpha$) to the success threshold.

3. The method of claim 1, wherein decreasing the success threshold comprises setting the success threshold to be equal to a prior success threshold value divided by a predetermined constant amount ($\beta$).

4. The method of claim 1, wherein the data transmission rate has a plurality of settable integer value modes, and increasing the data transmission rate comprises increasing to a mode which is approximately midway between a current mode and a maximum mode.

5. A method for wireless LAN (WLAN) device communication, comprising:
sending WLAN communications;
receiving acknowledgments of said sent WLAN communications;
configuring a data transmission rate for the sent WLAN communications, the data transmission rate selected in accordance with an adaptive rate algorithm process, comprising:
increasing the data transmission rate in response to receipt of a number of consecutive acknowledgments in excess of a success threshold;
responding to an acknowledgment received immediately after increasing the data transmission rate by increasing the success threshold;
responding to failure to receive the acknowledgment immediately after increasing the data transmission rate by increasing the success threshold and decreasing the data transmission rate;
responding to failure to receive the acknowledgment at instances other than immediately after increasing the data transmission rate by decreasing the success threshold and decreasing the data transmission rate.

6. The method of claim 5, wherein increasing the success threshold comprises adding a predetermined constant amount ($\alpha$) to the success threshold.

7. The method of claim 5, wherein decreasing the success threshold comprises setting the success threshold to be equal to a prior success threshold value divided by a predetermined constant amount ($\beta$).

8. The method of claim 5, wherein the data transmission rate has a plurality of settable integer value modes, and increasing the data transmission rate comprises increasing to a mode which is approximately midway between a current mode and a maximum mode.

9. A method for selecting a setting of a configurable data transmission rate for a wireless LAN (WLAN) device which operates to send WLAN communications and receive acknowledgments of said sent WLAN communications, the data transmission rate having a plurality of settings, comprising:
increasing the setting of the data transmission rate in response to receipt of a number of acknowledgments in excess of a success threshold, and
decreasing the setting of the data transmission rate in response to failure to receive the acknowledgment, the success threshold being increased in response to each increasing of the data transmission rate setting, and the success threshold being set to a fraction of the success threshold in response to decreasing of the data transmission rate setting.

10. The method of claim 9, wherein increasing the success threshold comprises increasing a value for the success threshold by a predetermined constant amount ($\alpha$).

11. The method of claim 9, wherein the success threshold being set to a fraction comprises setting a value for the success threshold to be equal to a prior success threshold value divided by a predetermined constant amount ($\beta$).

12. The method of claim 9, wherein the plurality of setting of the data transmission rate comprise a plurality of settable integer value modes, and increasing the data transmission rate comprises increasing to a mode which is approximately midway between a current mode and a maximum mode.

13. A method for wireless LAN (WLAN) device communication, comprising:
sending WLAN communications;
receiving acknowledgments of said sent WLAN communications;
configuring a data transmission rate for the sent WLAN communications, the data transmission rate having a plurality of settings selected in accordance with an adaptive rate algorithm process, comprising:
increasing the setting of the data transmission rate in response to receipt of a number of acknowledgments in excess of a success threshold;
decreasing the setting of the data transmission rate in response to failure to receive the acknowledgment;
increasing the success threshold in response to each increasing of the data transmission rate setting by the adaptive rate algorithm; and
setting the success threshold to a fraction of the success threshold in response to decreasing of the data transmission rate setting by the adaptive rate algorithm.

14. The method of claim 13, wherein increasing the success threshold comprises increasing a value for the success threshold by a predetermined constant amount ($\alpha$).

15. The method of claim 13, wherein setting the success threshold to a fraction comprises setting a value for the success threshold to be equal to a prior success threshold value divided by a predetermined constant amount ($\beta$).

16. The method of claim 13, wherein the plurality of settings for the data transmission rate comprise a plurality of settable integer value modes, and increasing the data transmission rate comprises increasing to a mode which is approximately midway between a current mode and a maximum mode.

17. A method for selecting a configurable data transmission rate for sent wireless LAN (WLAN) communications by a WLAN device which operates to send WLAN communications and receive acknowledgments of said sent WLAN communications, the WLAN device operating in a searching phase and a transmission phase, the method comprising:
when in the searching phase to search for a preferred data transmission rate:
increasing the data transmission rate in response to receipt of a number of consecutive acknowledgments in excess of a success threshold;
responding to an acknowledgment received immediately after increasing the data transmission rate by increasing the success threshold;
exiting the searching phase to enter the transmission phase with the increased data transmission rate as the preferred data transmission rate;
responding to failure to receive the acknowledgment immediately after increasing the data transmission rate by increasing the success threshold and decreasing the data transmission rate;

responding to failure to receive the acknowledgment at instances other than immediately after increasing the data transmission rate by decreasing the data transmission rate; and staying in the searching phase; and when in the transmission phase to transmit WLAN communications at the preferred data transmission rate:

increasing the data transmission rate in response to receipt of a number of consecutive acknowledgments in excess of a success threshold;

responding to an acknowledgment received immediately after increasing the data transmission rate by increasing the success threshold;

responding to failure to receive the acknowledgment immediately after increasing the data transmission rate by increasing the success threshold, decreasing the data transmission rate and exiting the transmission phase to enter the searching phase; and responding to failure to receive the acknowledgment at instances other than immediately after increasing the data transmission rate by decreasing the data transmission rate and exiting the transmission phase to enter the searching phase.

18. The method of claim 17, wherein increasing the success threshold comprises adding a predetermined constant amount ($\alpha$) to the success threshold.

19. The method of claim 17, wherein decreasing the success threshold comprises setting the success threshold to be equal to a prior success threshold value divided by a predetermined constant amount ($\beta$).

20. A method for wireless LAN (WLAN) device communication, comprising:

sending WLAN communications;

receiving acknowledgments of said sent WLAN communications;

operating in a searching phase and a transmission phase;

configuring a data transmission rate for the sent WLAN communications, the data transmission rate selected in accordance with an adaptive rate algorithm process, comprising:

when operating in the searching phase to search for a preferred data transmission rate:

increasing the data transmission rate in response to receipt of a number of consecutive acknowledgments in excess of a success threshold;

responding to an acknowledgment received immediately after increasing the data transmission rate by increasing the success threshold;

exiting the searching phase to enter the transmission phase with the increased data transmission rate as the preferred data transmission rate;

responding to failure to receive the acknowledgment immediately after increasing the data transmission rate by increasing the success threshold and decreasing the data transmission rate;

responding to failure to receive the acknowledgment at instances other than immediately after increasing the data transmission rate by decreasing the data transmission rate; and staying in the searching phase; and when operating in the transmission phase to transmit WLAN communications at the preferred data transmission rate:

increasing the data transmission rate in response to receipt of a number of consecutive acknowledgments in excess of a success threshold;

responding to an acknowledgment received immediately after increasing the data transmission rate by increasing the success threshold;

responding to failure to receive the acknowledgment immediately after increasing the data transmission rate by increasing the success threshold, decreasing the data transmission rate and exiting the transmission phase to enter the searching phase; and responding to failure to receive the acknowledgment at instances other than immediately after increasing the data transmission rate by decreasing the data transmission rate and exiting the transmission phase to enter the searching phase.

21. The method of claim 20, wherein increasing the success threshold comprises adding a predetermined constant amount ($\alpha$) to the success threshold.

22. The method of claim 20, wherein decreasing the success threshold comprises setting the success threshold to be equal to a prior success threshold value divided by a predetermined constant amount ($\beta$).

* * * * *